United States Patent [19]

Fairman

[11] Patent Number: 4,908,641

[45] Date of Patent: Mar. 13, 1990

[54] PHOTOGRAPHIC FILM AND FILM CASSETTE

[75] Inventor: Patricia D. Fairman, Spencerport, N.Y.

[73] Assignee: Eastman Kodak Company, Rochester, N.Y.

[21] Appl. No.: 349,480

[22] Filed: May 9, 1989

[51] Int. Cl.⁴ .............................................. G03B 17/26
[52] U.S. Cl. ................... 354/275; 352/78 C; 352/235; 352/241; 242/71.1; 242/195
[58] Field of Search ............... 354/213, 275; 352/235, 352/241, 239, 78 C; 242/71.1, 195; 226/12, 45

[56] References Cited

U.S. PATENT DOCUMENTS

| | | | |
|---|---|---|---|
| 988,341 | 4/1911 | Hill | 242/71.8 |
| 1,221,847 | 4/1917 | Elmstrom et al. | 354/212 |
| 1,871,983 | 8/1932 | Goldhammer | 242/74 |
| 1,921,559 | 8/1933 | Case | 242/71.1 X |
| 1,997,410 | 4/1935 | Douden | 352/235 X |
| 2,541,476 | 2/1951 | Mihalyi | 242/71.1 |
| 2,559,892 | 7/1951 | Mihalyi et al. | 242/71.4 |
| 2,701,507 | 2/1955 | Bergerhoff | 354/212 |
| 3,234,024 | 2/1966 | Leinonen | 96/78 |
| 3,556,435 | 1/1971 | Wangerin | 242/195 X |
| 3,659,799 | 5/1972 | Cerutti et al. | 242/71.9 |
| 3,665,830 | 5/1972 | Maeda | 354/213 |
| 3,677,499 | 7/1972 | Wangerin | 242/195 X |
| 3,797,777 | 3/1974 | Hosono et al. | 242/195 X |
| 4,223,990 | 9/1980 | Edwards | 354/213 X |
| 4,294,713 | 10/1981 | Knollmuller et al. | 252/28 |
| 4,295,713 | 10/1981 | Edwards | 352/235 X |
| 4,303,325 | 12/1981 | Seely | 354/275 X |
| 4,407,579 | 10/1983 | Huff | 354/275 |
| 4,420,236 | 12/1983 | Taniguichi et al. | 354/21 |
| 4,423,943 | 1/1984 | Gold | 354/275 |
| 4,488,796 | 12/1984 | Edwards | 354/275 |

Primary Examiner—L. T. Hix
Assistant Examiner—Brian W. Brown
Attorney, Agent, or Firm—Roger A. Fields

[57] ABSTRACT

A film cassette is disclosed wherein a filmstrip beginning with a relatively short non-protruding leader portion can be advanced automatically to the exterior of the cassette responsive to rotation of a film spool in a film unwinding direction. The filmstrip has one metering perforation per film frame in a relatively long imaging portion and several much closer spaced take-up perforations in its leader portion. Preferably, the take-up perforations are located along a different longitudinal edge of the filmstrip than the metering perforations are located, to positively prevent the possiblity of mistaking one of the take-up perforations for one of the metering perforations in a camera.

7 Claims, 7 Drawing Sheets

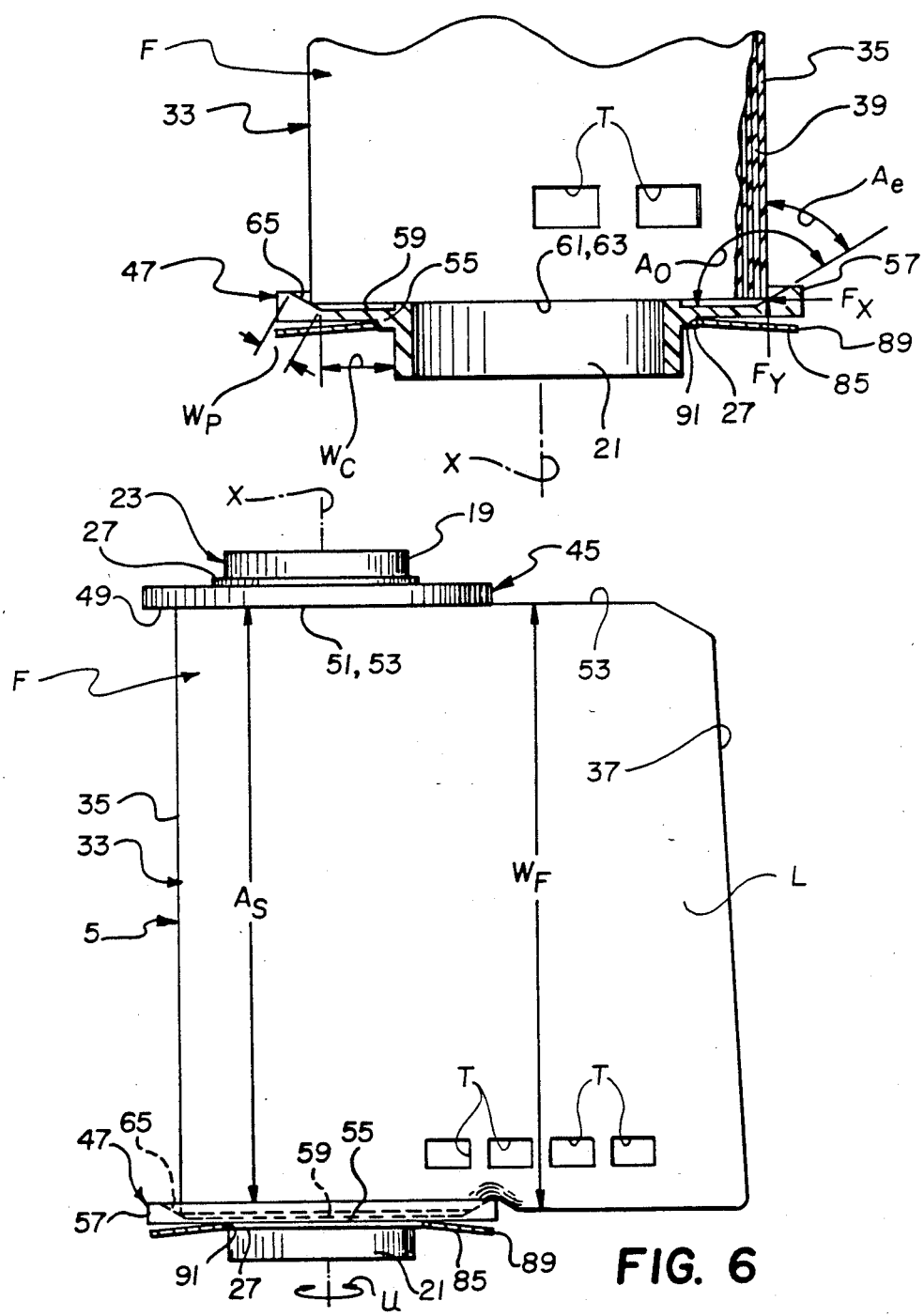

PHOTOGRAPHIC FILM AND FILM CASSETTE

CROSS-REFERENCE TO RELATED APPLICATIONS

Reference is made to commonly assigned copending applications Ser. No. 07/320,441, entitled FILM CASSETTE, and filed Mar. 8, 1989 in the name of John J. Niedospial and Bradley S. Bush, and Ser. No. 07/349,474, entitled FILM METERING DEFEAT MECHANISM, and filed May 9, 1989, in the name of Daniel M. Pagano.

BACKGROUND OF THE INVENTION

1. Field of the Invention

The invention relates specifically to the field of photography, and particularly to a photographic film and a film cassette.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading portion of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Consequently, rotation of the spool in the unwinding direction cannot serve to advance the filmstrip out of the shell, and it is necessary in the typical 35 mm camera to engage the protruding leader portion to draw the filmstrip out of the shell. Typically, the leader portion includes a series of take-up perforations located along the same longitudinal edge as a row of similarly spaced metering perforations in the imaging portion of the filmstrip, as in U.S. Pat. No. 3,665,830, or a hole proximate a forward edge of the leader portion, as in U.S. Pat. Nos. 4,295,173 and 4,303,325, for engagement with a corresponding tooth of a take-up spool in the camera.

A 35 mm film cassette has been proposed which, unlike conventional film cassettes, can be operated to automatically advance the filmstrip out of the cassette shell by rotating the film spool in the unwinding direction. The leader portion normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader portion can be manually grasped and attached to a film advancing device in the camera. In order to attach the leader portion of the film advancing device, a row of metering perforations in the imaging portion of the fimstrip is continued along the leader portion.

THE CROSS-REFERENCED APPLICATIONS

Like the type of film cassette disclosed in U.S. Pat. No. 4,423,943, the cross-referenced applications each disclose a film cassette that contains a non-protruding film leader which can be advanced automatically to the outside of the cassette shell in response to rotation of the film spool in an unwinding direction. Similarly, a row of metering perforations is continued along the filmstrip from its imaging portion to its leader portion.

SUMMARY OF THE INVENTION

According to one aspect of the invention, there is provided an improved film cassette wherein
  (a) a filmstrip has a relatively short non-protruding leader portion and a relatively long imaging portion including a longitudinal series of spaced identical metering perforations having a common pitch to enable the imaging portion to be precisely metered for picture-taking in a camera and
  (b) a film spool is rotatable in a film unwinding direction to propel the filmstrip beginning with the leader portion out of the cassette for engagement of the leader portion with a take-up spool in the camera, and wherein the improvement comprises:
  said leader portion includes a longitudinal series of spaced identical take-up perforations having a common pitch that is substantially less than the pitch of the metering perforations to enable the leader portion to be engaged by a take-up spool in a camera, whereby because of the difference between the respective pitches of the metering perforations and the take-up perforations the possibility of mistaking the take-up perforations for the metering perforations in the camera may be prevented.

Preferably, the filmstrip has a pair of opposite longitudinal edges, and the metering perforations are located along the imaging portion only in the vicinity of one of the longitudinal edges. The take-up perforations are located along the leader portion only in the vicinity of the other longitudinal edge. Thus, because the metering perforations and the take-up perforations are not located in the vicinity of the same longitudinal edge the possibility of mistaking the take-up perforations for the metering perforations in a camera may be prevented.

According to another aspect of the invention, there is provided an improved filmstrip wherein (a) a relatively long imaging portion includes a longitudinal series of spaced identical metering perforations having a common pitch to enable the imaging portion to be precisely metered for picture-taking in a camera and (b) a relatively short leader portion is adapted for engagement with a take-up spool in the camera, and wherein the improvement comprises:

said leader portion includes a longitudinal series of spaced identical take-up perforations having a common pitch that is substantially less than the pitch of the metering perforations to enable the leader portion to be engaged by a take-up spool in a camera, whereby because of the difference between the respective pitches of the metering perforations and the take-up perforations the possibility of mistaking the take-up perforations for the metering perforations in the camera may be prevented.

BRIEF DESCRIPTION OF THE DRAWINGS

FIG. 5 is an elevation view partly in section similar to FIG. 4, illustrating certain details of the film roll and the film spool;

FIG. 6 is an elevation view similar to FIG. 4 illustrating the manner in which the film roll is unwound from the film spool;

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
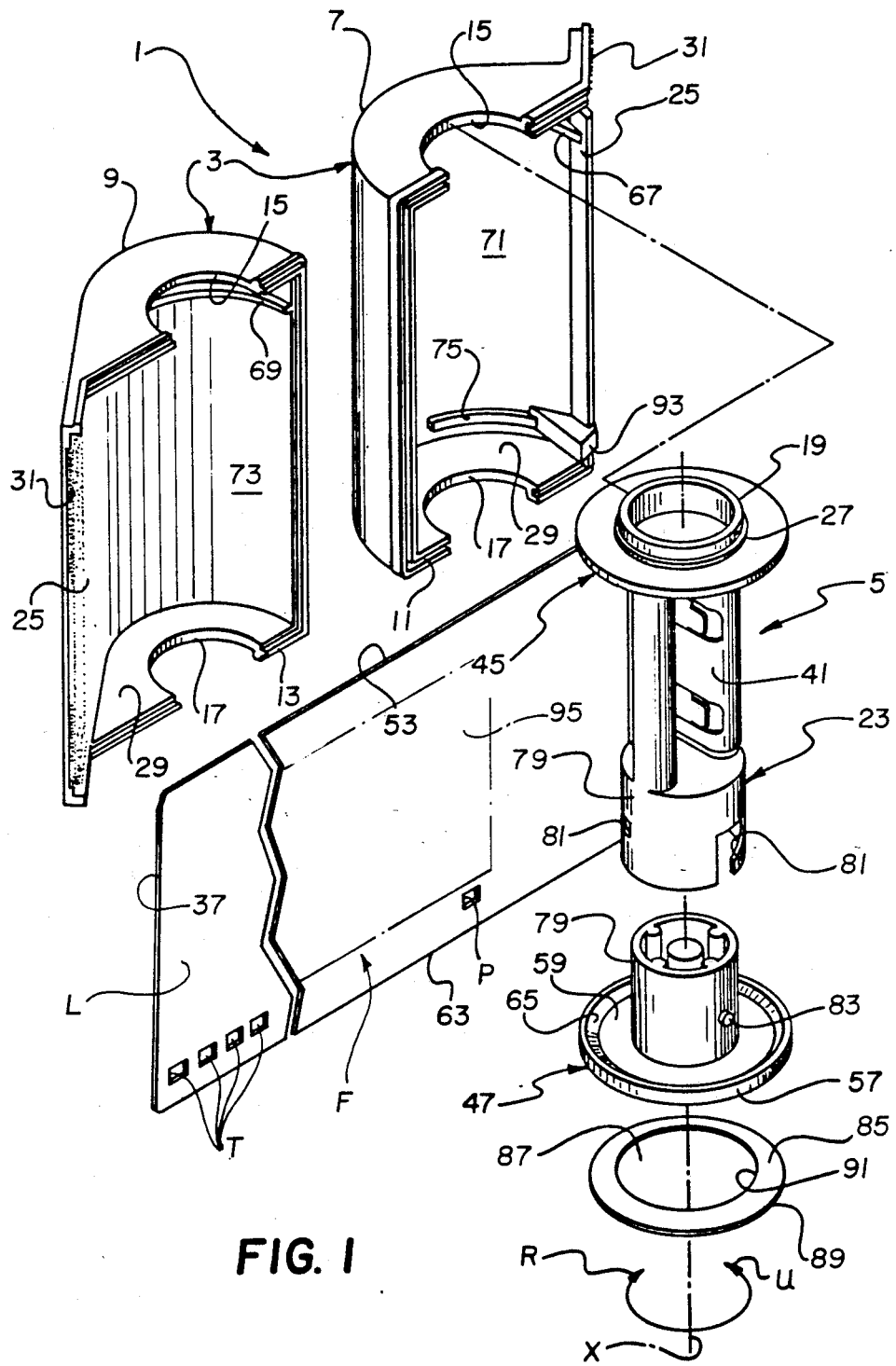
FIG. 1 is an exploded perspective view of an improved film cassette according to a preferred embodiment of the invention.
Figure 2:
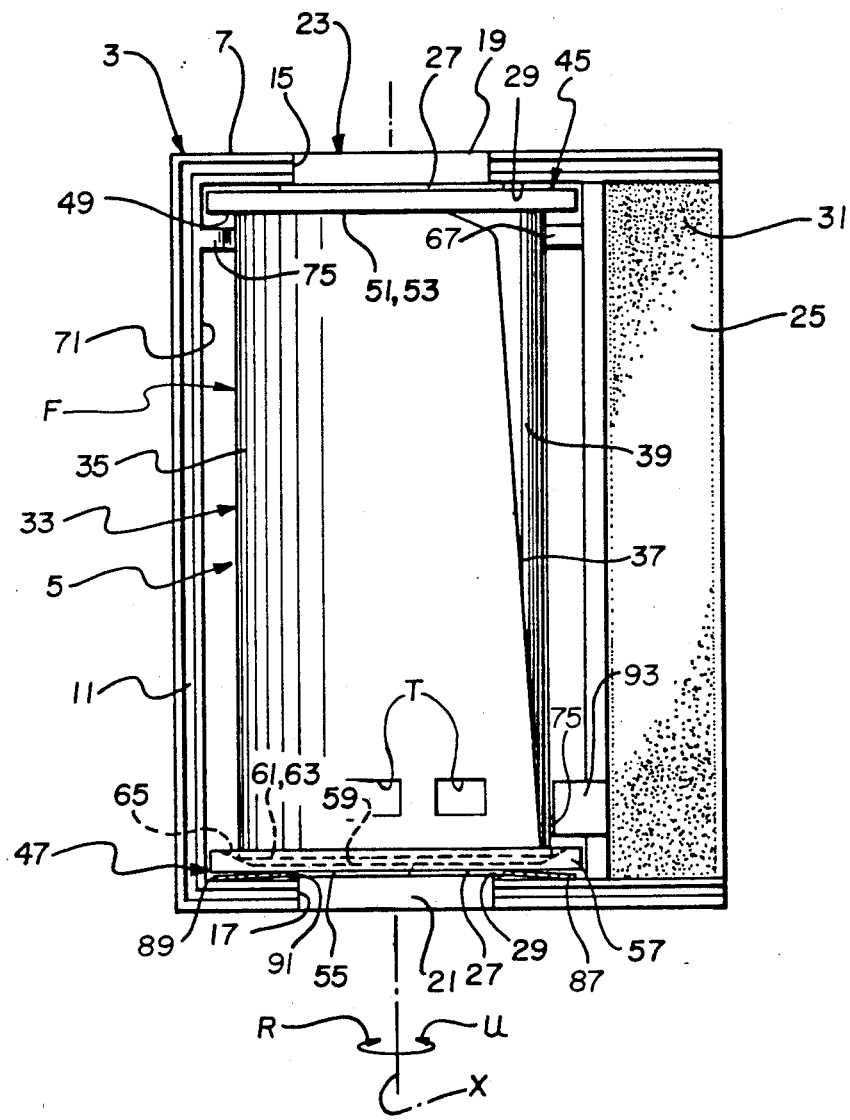
FIG. 2 is an elevation view of the film cassette, illustrating the cassette shell open to reveal a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and rewinding directions U and R within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for upper and lower opposite end extensions 19 and 21 of a spool core or hub 23, and they define a film passageway 25 to the exterior of the cassette shell 3. The upper and lower end extrusions 19 and 21 of the spool core 23 include respective integral annular surrounds 27 located adjacent upper and lower inside faces 29 of the cassette shell 3 which encircle the two openings 15 and 17. This is to prevent ambient light from entering the interior of the cassette shell 3 through the openings 15 and 17. A known black velvet or plush material 31 lines the interior of the film passageway 25 to prevent ambient light from entering the film passageway.

Figure 3:
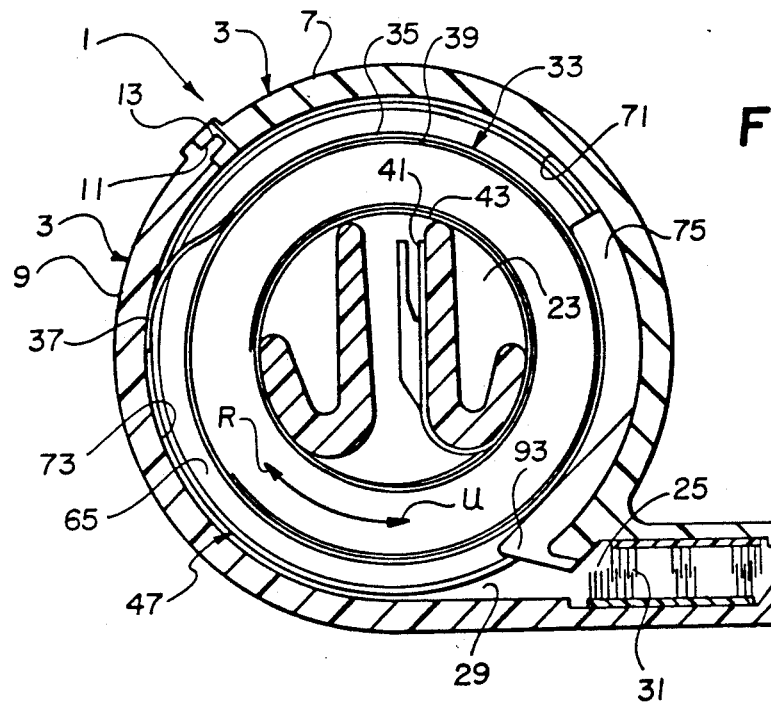
FIG. 3 is an end view in cross-section of the cassette shell, the film roll, and the film spool.
Figure 4:
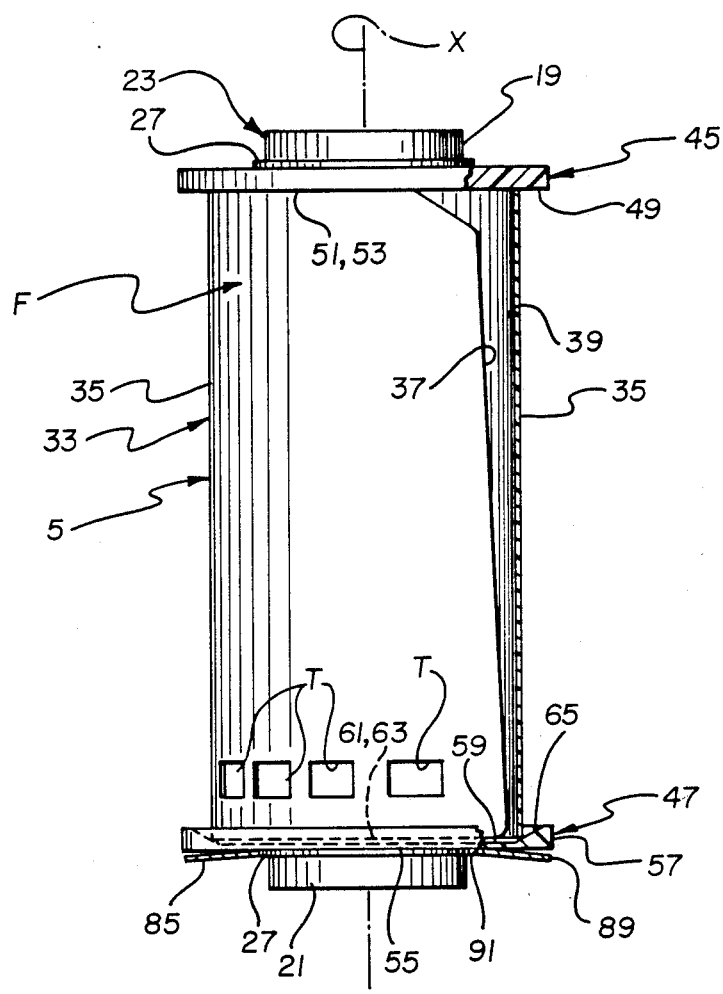
FIG. 4 is an elevation view partially in section of the film roll and the film spool, illustrating the manner in which the film roll is stored on the film spool.

A roll 33 of 35 mm filmstrip F is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. An inner or trailing end 41 of an innermost convolution 43 of the film roll 33 is secured to the spool core 23.

A pair of upper and lower flanges 45 and 47 radially extend from the spool core 23 as shown in FIGS. 1, 2, 4 and 5. The upper flange 45 is disk-like, and it has a circular flat inside face 49 that contacts an upper side 51 of the film roll 33 defined by the upper longitudinal edge 53 of each successive convolution of the film roll 33, including the outermost convolution (film leader) 35. The lower flange 47 comprises a disk portion 55 and an annular lip or skirt portion 57 which circumferentially extends from the disk portion. The disk portion 55 has an inside central annular flat face 59 that is closely spaced from a lower side 61 of the film roll 33 defined by the lower longitudinal edge 63 of each successive convolution of the film roll. The annular lip portion 57 has an inside peripheral annular beveled face 65 that is circumferentially inclined from the central flat face 59 to normally intimately contact the lower longitudinal edge 63 of the outermost convolution (film leader) 35 and perhaps the next-inward convolution 39 of the film roll 33, to radially constrain the film roll at the lower longitudinal edge and thereby restrict the maximum diameter of the film roll 33 to a value less than the diameter of the two flanges 45 and 47. The peripheral beveled face 65 has a width $W_p$ that is less than the width $W_e$ of the central flat face 59, and it is inclined an obtuse angle $A_o$ with respect to the central flat face. See FIG. 5. The obtuse angle $A_o$ is sufficient to allow the peripheral beveled face 65 to form a capture angle $A_e$ with respect to the outermost convolution (film leader) 35. Preferably the capture angle $A_e$ is within the range of 35° to 45°.

The maximum diameter of the film roll 33 may further be restricted to a value less than the diameter of the two flanges 45 and 47 by a pair of arcuate ribs 67 and 69 fixed to the two halves 7 and 9 of the cassette shell 3 at their respective inner walls 71 and 73 and by a single arcuate rib 75 fixed to the first-numbered inner wall. The three ribs 67, 69 and 75 protrude radially between the two flanges 45 and 47 to circumferentially confine the outermost convolution (film leader) 35 of the film roll 33. See FIGS. 1-3. Preferably, the ribs 67, 69 and 75 are relatively smooth at their respective areas of contact with the outermost convolution 35.

As shown in FIG. 1, the spool core 23 is comprised of two hollow, cylindrical, coaxial pieces 77 and 79. The upper core piece 77 is integrally formed with the upper flange 45 and the lower core piece 79 is integrally formed with the lower flange 47. The upper core piece 77 is constructed to telescopically receive the lower core piece 79 in order to vary the axial distance between the upper and lower flanges 45 and 47. The specific means for varying the axial distance between the two flanges 45 and 47 consists of a pair of inclined, opposite cam edges or ramps 81 located on the upper core piece 77 and respective cam follower pins 83 located on the lower core piece 79. If the lower core piece 79 is initially rotated relative to the upper core piece 77 in the film unwinding direction U, the interaction between the two cam edges 81 and the respective follower pins 83 will cause the lower core piece to be further received within the upper core piece, i.e. the lower core piece will be moved axially toward the upper core piece, thereby slightly reducing the axial distance between the two flanges 45 and 47. The lower core piece 79 can be moved axially toward the upper core piece 77 only until the peripheral beveled face 65 of the lower flange 47 is moved into a very firm compressive relation with the lower longitudinal edge 63 of the outermost convolution (film leader) 35. Then, continued rotation of the lower core piece 79 in the unwinding direction will rotate the film roll 33 in the same direction.

When the lower core piece 79 is moved axially toward the upper core piece to shift the peripheral beveled face 65 of the lower flange 47 into a very firm compressive relation with the lower longitudinal edge 63 of the outermost convolution (film leader) 35, axial clamping forces are concentrated for the most part at the outermost convolution. FIG. 5 schematically illustrates the X-component $F_x$ and the Y-component $F_y$ of these clamping forces at the outermost convolution 35. Thus, the $F_x$ force component acts to radially constrain the outermost convolution (film leader) 35 at its lower longitudinal edge 35, and the $F_y$ component acts to ensure a non-slipping relation between the longitudinal edge and the peripheral beveled face 65 of the lower flange 47. The non-slipping relation is necessary to rotate the outermost convolution 35 in the unwinding direction U responsive to rotation of the film spool 5 in the same direction.

A spring-washer 85 as shown in FIGS. 1 and 2 has a central opening 87 through which the lower extension 21 of the spool core 23 axially extends. The spring washer 85 has a circumferential edge 89 in contact with the lower inside face 29 of the cassette shell 3 and an inner edge 91 (defining the central opening 87) in contact with the annular surround 27 of the lower extension. Thus, the spring-washer 85 operates as a compressive spring to normally urge the peripheral beveled face 65 of the lower flange 47 against the lower longitudinal edge 63 of the outermost convolution (film leader) 35. See FIG. 5.

A film-stripper guide 93 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the film unwinding direction U during application of the axial clamping forces. The leading end 37 will be advanced over the stripper-guide 93 and into the film passageway 25, rather than between the stripper-guide and the next-inward convolution 39, because it tends to be transversely bowed by the axial clamping forces and therefore will slightly separate from the next-inward convolution 39 of the film roll 5.

When the leading end 37 of the outermost convolution (film leader) 35 is advanced over the stripper-guide 93 responsive to rotation of the film spool 5 in the film unwinding direction U during application of the axial clamping forces, the lower longitudinal edge 63 of that convolution will be sightly flexed by the annular lip portion 57 of the lower flange 47 as shown in FIG. 6 to allow successive longitudinal sections of the film roll 33 (beginning with the leading end) to exit from between the flanges to the outside of the cassette shell 3. The local flexing of the lower longitudinal edge 63 of the outermost convolution 35 occurs because the film width $W_F$ between that edge and the upper longitudinal edge 63 of the outermost convolution is slightly greater than the axial spacing $A_S$ between the upper flange 45 and the annular lip portion 57 of the lower flange 47.

Figure 7:
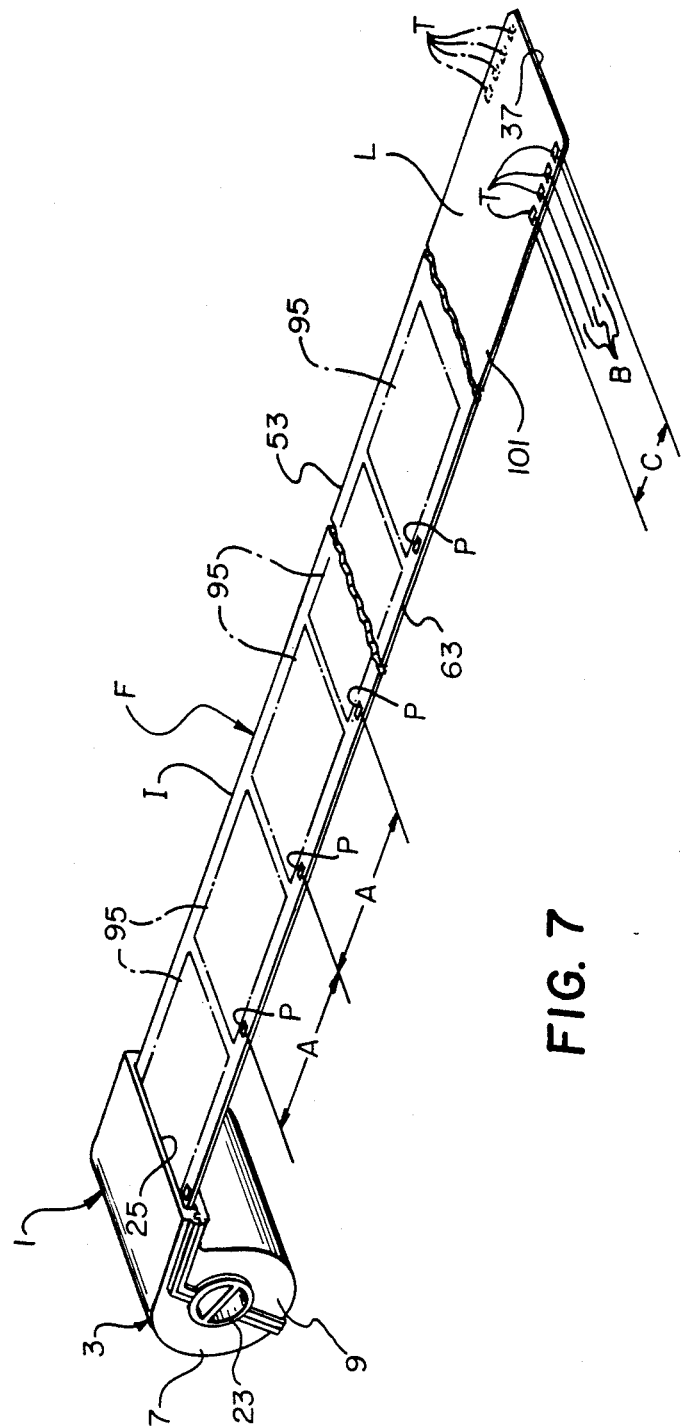
FIG. 7 is a perspective view of the film cassette and the filmstrip, illustrating the filmstrip advanced to the exterior of the cassette shell.
Figure 8:
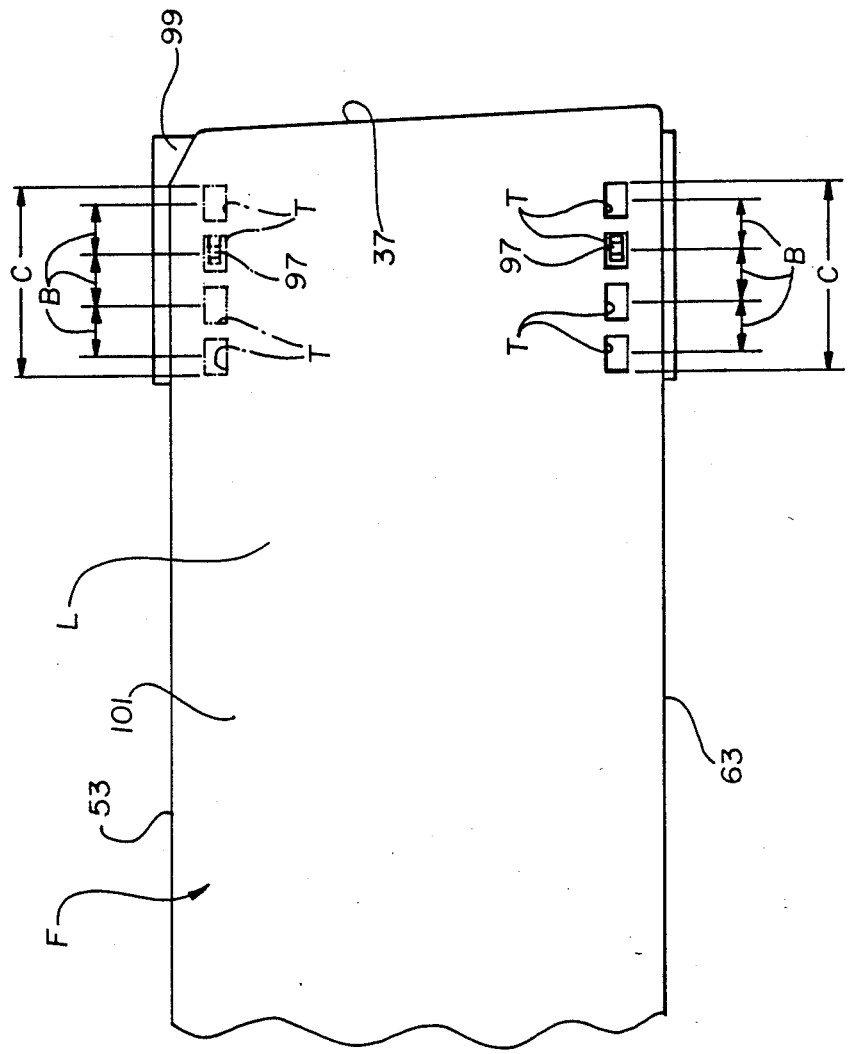
FIG. 8 is a plan view of the leader portion of the filmstrip.

FIG. 7 shows the filmstrip F advanced for the most part from the cassette shell 3. According to the illustration, the filmstrip F has a relatively short leader portion L and a relatively long imaging portion I which includes a single row of spaced identical metering perforations P located adjacent to the longitudinal edge 63 of the filmstrip. As is previously known, the metering perforations P have a common pitch A. That is, there is one metering perforation for each imaging area or film frame 95 to enable the imaging portion I to be conventionally metered for picture-taking by typical metering apparatus, not shown, in a camera. Conversely, the leader portion L includes only four spaced identical take-up perforations T having a common pitch B that uniquely is considerably less than the pitch A of the metering perforations P. The take-up perforations T may be located adjacent the longitudinal edge 63 of the filmstrip F (as shown in solid line in FIG. 7), or alternatively they may be located adjacent the longitudinal edge 53 of the filmstrip (as shown in broken line in FIG. 7). In either instance, they are arranged close to the leading end 37 of the leader portion L in order to enable a tooth 97 of a conventional take-up drum or spool 99 in a camera to promptly engage the leader portion. See FIG. 8. The take-up perforations T occupy a total film length C that is less than the pitch A of the metering perforations P, and they are separated from the latter perforations by an imperforate film section 101 having a film length that is greater than the pitch of the metering perforations.

Due to the difference between the respective pitches A and B of the metering perforations P and the take-up perforations T, the possibility that the one type perforation may be mistaken for the other type perforation in a camera is lessened. For example, since the take-up perforations T have a much greater frequency for the film length C in FIGS. 7 and 8 than the metering perforations P have for the same film length, a computer controlled perforation counter could be devised to distinguish between the two perforations in the camera. Alternatively, the take-up perforations T could be located along a different longitudinal edge of the filmstrip F than the metering perforations P are located, to prevent the possibility of mistaking one type perforation for the other type perforation in the camera.

The invention has been described with reference to a preferred embodiment. However, it will be appreciated that variations and modifications can be effected within the ordinary skill in the art without departing from the scope of the invention. For example, although the leading end 37 of the leader portion L is located wholly within the cassette shell 3, a film cassette could be devised wherein the leading end slightly protrudes from the cassette shell.

I claim:

1. An improved film cassette wherein (a) a filmstrip has a relatively short non-protruding leader portion and a relatively long imaging portion including a longitudinal series of spaced identical metering perforations having a common pitch to enable said imaging portion to be precisely metered for picture-taking in a camera and (b) a film spool is rotatable in a film unwinding direction to propel said filmstrip beginning with said leader portion out of said cassette for engagement of the leader portion with a take-up spool in the camera, and wherein the improvement comprises:

said leader portion includes a longitudinal series of spaced identical take-up perforations having a common pitch that is substantially less than the pitch of said metering perforations to enable the leader portion to be engaged by a take-up spool in a camera, whereby because of the difference between the respective pitches of said metering perforations and said take-up perforations the possibility of mistaking the take-up perforations for the metering perforations in the camera may be prevented.

2. The improvement as recited in claim 1, wherein said filmstrip has a pair of opposite longitudinal edges, said metering perforations are located along said imaging portion only in the vicinity of one of said longitudinal edges, and said take-up perforations are located along said leader portion only in the vicinity of the other longitudinal edge, whereby because said metering perforations and said take-up perforations are not located in the vicinity of the same longitudinal edge the possibility of mistaking the take-up edge the possibility of mistaking the take-up perforations for the metering perforations in a camera may be prevented.

3. The improvement as recited in claim 1, wherein said take-up perforations occupy a total film length along said leader portion that is less than the pitch of said metering perforations.

4. The improvement as recited in claim 3, wherein said take-up perforations are located proximate a forward edge of said leader portion, and said leader portion includes an imperforate section longitudinally separating said take-up perforations and said metering perforations a film length that is greater than the pitch of the metering perforations.

5. An improved filmstrip wherein (a) a relatively long imaging portion includes a longitudinal series of spaced identical metering perforations having a common pitch to enable said imaging portion to be precisely metered for picture-taking in a camera and (b) a relatively short leader portion is adapted for engagement with a take-up spool in the camera, and wherein the improvement comprises:

said film leader includes a longitudinal series of spaced identical take-up perforations having a common pitch that is substantially less than the pitch of said metering perforations to enable the leader portion to be engaged by a take-up spool in a camera, whereby because of the difference between the respective pitches of said metering perforations and said take-up perforations the possibility of mistaking the take-up perforations for the metering perforations in the camera may be prevented.

6. The improvement as recited in claim 5, longitudinal edges, said metering perforations are located along said imaging portion only in the vicinity of one of said longitudinal edges, and said take-up perforations are located along said leader portion only in the vicinity of the other longitudinal edge, whereby because said metering perforations and said take-up perforations are not located in the vicinity of the same longitudinal edge the possibility of mistaking the take-up perforations for the metering perforations in a camera may be prevented.

7. The improvement as recited in claim 5, wherein said take-up perforations occupy a total film length along said leader portion that is less than the pitch of said metering perforations.

* * * * *

UNITED STATES PATENT AND TRADEMARK OFFICE
CERTIFICATE OF CORRECTION

PATENT NO. : 4,908,641
DATED : March 13, 1990
INVENTOR(S) : P. D. Fairman

It is certified that error appears in the above-identified patent and that said Letters Patent is hereby corrected as shown below:

Column 1, line 50     "4,295,173" should read --4,295,713--

Signed and Sealed this

Twenty-first Day of May, 1991

Attest:

HARRY F. MANBECK, JR.

Attesting Officer     Commissioner of Patents and Trademarks